(12) United States Patent
Dyer

(10) Patent No.: US 9,074,121 B2
(45) Date of Patent: Jul. 7, 2015

(54) OIL WELL CLEANING COMPOSITIONS

(76) Inventor: Richard J. Dyer, Bakersfield, CA (US)

( * ) Notice: Subject to any disclaimer, the term of this patent is extended or adjusted under 35 U.S.C. 154(b) by 736 days.

(21) Appl. No.: 13/385,544

(22) Filed: Feb. 24, 2012

(65) Prior Publication Data

US 2012/0234548 A1 Sep. 20, 2012

Related U.S. Application Data

(60) Provisional application No. 61/465,170, filed on Mar. 15, 2011.

(51) Int. Cl.
*E21B 37/00* (2006.01)
*C09K 8/524* (2006.01)

(52) U.S. Cl.
CPC ............... *C09K 8/524* (2013.01); *E21B 37/00* (2013.01)

(58) Field of Classification Search
CPC ......... E21B 37/00; E21B 37/08; E21B 37/06; E21B 43/25; C09K 8/74; C09K 8/52; C09K 8/68; C09K 8/524; C09K 2208/32; C09K 2208/14
USPC .............. 166/177.7, 191, 202, 222, 304, 307, 166/311, 312; 507/203, 259–263, 277, 930, 507/931
See application file for complete search history.

(56) References Cited

U.S. PATENT DOCUMENTS

| | | | | |
|---|---|---|---|---|
| 2,358,665 | A * | 9/1944 | Shapiro | 510/188 |
| 3,279,541 | A * | 10/1966 | Knox et al. | 166/300 |
| 3,353,603 | A * | 11/1967 | Knight | 166/307 |
| 3,724,553 | A * | 4/1973 | Snavely et al. | 166/304 |
| 4,101,425 | A * | 7/1978 | Young et al. | 507/260 |
| 4,614,236 | A * | 9/1986 | Watkins et al. | 166/304 |
| 4,836,286 | A * | 6/1989 | Edwards | 166/304 |
| 5,008,026 | A * | 4/1991 | Gardner et al. | 507/235 |
| 5,152,907 | A * | 10/1992 | Dulaney et al. | 507/261 |
| 5,762,138 | A * | 6/1998 | Ford et al. | 166/279 |
| 6,197,734 | B1 * | 3/2001 | Vlasblom | 510/188 |
| 6,242,388 | B1 * | 6/2001 | Sharma et al. | 507/90 |
| 6,593,279 | B2 * | 7/2003 | Von Krosigk et al. | 507/267 |
| 7,296,627 | B2 * | 11/2007 | Dyer | 166/304 |
| 7,497,261 | B2 * | 3/2009 | Dyer | 166/304 |
| 7,632,785 | B2 * | 12/2009 | Dyer | 507/90 |
| 7,670,993 | B2 * | 3/2010 | Dyer | 507/90 |
| 2008/0047712 | A1 * | 2/2008 | Dyer | 166/304 |
| 2009/0200027 | A1 * | 8/2009 | Kakadjian et al. | 166/270.1 |
| 2010/0152069 | A1 * | 6/2010 | Harris | 507/201 |

* cited by examiner

*Primary Examiner* — Daniel P Stephenson
(74) *Attorney, Agent, or Firm* — James J. Mullen

(57) ABSTRACT

A method for cleaning oil wells to increase the flow of oil thereof by use of a unique cleaning emulsion comprising of water, hydrocarbon solvent, terpene hydrocarbon material, demulsifier, detergent, and optionally an acid. This one step method provides for the simultaneously cleaning/removal of asphaltene and/or paraffin and scale at a wide range of temperatures. This method can be used alone or with the assistance of a wash tool which is a combination pressure and surge wash tool having a nipple assembly, or a hydro self-rotating nozzle wash tool.

8 Claims, 1 Drawing Sheet

OIL WELL CLEANING COMPOSITIONS

RELATED PATENT APPLICATIONS

This present pending utility patent application is derived from provisional patent application Ser. No. 61/465,170 filed on Mar. 15, 2011 and is the priority date for this pending utility patent application.

BACKGROUND OF THE INVENTION

1. Field of the Invention

This invention relates to oil and gas production wells and particularly to methods of simultaneously removing asphaltene and/or paraffin and scale from such wells with eco-friendly compositions used under adverse weather conditions.

2. Description of the Prior Art

Paraffin and/or asphaltene and scale formation in producing oil wells, and particularly those wells producing high-paraffin containing oils, significantly interferes with the effectiveness and efficiency of the well production. In severe cases, the presence of paraffin and/or asphaltene and scale, can, in essence, cause the oil production for a given well to cease.

Generally, the paraffin and/or asphaltene crystallizes out of and solidifies in the well bore, the area surrounding the well bore, the casing and tubing of the well thereby blocking further production.

In the past, attempts have been made to remove the paraffin and/or asphaltene by mechanically cutting it out of the well or using a so-called "hot-oiling" technique. The cutting procedure is a relatively crude procedure and requires extensive well shutdown time. Moreover, it is extremely inefficient inasmuch as substantial amounts of paraffin and/or asphaltene remain in the well. This remaining paraffin and/or asphaltene provides seed crystals which promote the rapid formation of additional paraffin and/or asphaltene. Consequently, paraffin and/or asphaltene builds up and the blocking situation quickly occurs again.

In the hot-oiling method, produced crude is heated to a temperature well above the melting point of the paraffin and/or asphaltene and is then circulated down through the annulus of the well and returned to a hot-oil heating truck via the production tubing. The purpose here is for the hot oil to melt and/or dissolve the paraffin so that it can be removed from the well in liquid form. This is an expensive method since the crude must be put through a heater treater along with a demulsifier in order to facilitate the removal of solids and water therefrom. In this method, the crude oil used is taken from the stock tank and has thus already made one pass through the treating facility and has already been demulsified. Another disadvantage to this method is that in many instances, 100% of the fluid injected is not recovered and thus some is lost to the reservoir.

During the hot-oiling process, a paraffin dispersant which is based on a petroleum sulfonate is added to the crude as it is being heated. The paraffin dispersant assists in dispersing the melted paraffin in the hot-oil phase.

Moreover, this technique is very dangerous, particularly with wells producing a crude having a low flash point. Indeed, such wells cannot be hot-oiled because the auto-ignition temperature of the oil is so low. Thus, bringing the oil in direct contact with a heating mechanism creates a substantial fire hazard.

Another procedure that has been tried is the so-called "hot acid" technique. In this process, an attempt is made to melt paraffin using a combination of hot water, heated xylene and hot acid. However, while this mixture may have some effect on the removal of carbonate scale build-up in wells, it has not presented a satisfactory answer to paraffin and/or asphaltene removal.

An additional disadvantage of each of the above methods is due to the fact that normally it is desirable to subject a well to acidization at some subsequent point in time after the paraffin and/or asphaltene removal. The mechanical cutting technique, hot-acid technique, and the hot-oil techniques leave the well bore, the area surrounding the well bore casing and tubing "oil wet". This is a disadvantageous situation for subsequent acidization. In the acidization technique, a mineral acid solution is introduced into the well to remove mineral deposits. The acid solution is aqueous and, if the interior portions and mechanical elements of the well are oil wet, direct contact of these surfaces with the acid solution is inhibited making the acidization treatment much less effective.

Such stimulation of oil and gas wells is a well known process and is described in U.S. Pat. No. 4,541,483.

Other more recent prior art attempts have been made trying to overcome the presence of the undesirable paraffin and/or asphaltene and scale in oil wells and associated equipment as stated below. In U.S. Pat. No. 3,930,539 there is disclosed a method for increasing the production in wells by the utilization of hydrochloric and phosphoric acid followed by ammonia to create a violent exothermic reaction at the bottom of the well and thus disintegrate the limestone and emulsify the paraffin thereby creating larger passages in the formation and which permits greater flow. This is not desirable since the reactions themselves create safety hazards and the paraffin still remains.

In U.S. Pat. No. 4,836,286, there is disclosed a method of removing flow-restricting matter such as paraffins from wells by use of a three stage process of introducing various solvent solutions into the bottom of the well over a period of time and then removing the solvents there from and passing an electrical charge there through followed by the reintroduction into the well. This has the disadvantage of numerous steps and the use of electrical charge.

In U.S. Pat. No. 6,593,279, there is disclosed the use of an acid based emulsion for cleaning oil sludges from well cuttings, well formations and down hole wells. These emulsions contain water, a surfactant mixture, an oil, a solvent, and an oxidizer. There is no disclosure of the removal of scale.

In U.S. Pat. No. 4,278,129, there is disclosed a two stage process of stimulating an oil well by the use of an oxyalkylated phosphate ester surfactant followed by the introduction of a hydrocarbon to drive the ester into the formation.

In U.S. Pat. No. 4,813,482, there is disclosed a method of removing paraffin from an oil well by treating the well with a heated solution containing a surfactant, a hydrocarbon solvent, and water in order to disperse the paraffin with the well into the solution.

In U.S. Pat. No. 5,909,774, there is disclosed a method of cleaning up a producing interval of a well bore drilled using a synthetic oil-water emulsion drill-in fluid. This method involves the use of three treatment fluids in three separate stages.

In U.S. Pat. No. 6,112,814, there is disclosed a method for cleaning a well bore plugged with deposits of heavy hydrocarbons and finely-divided inorganic solids by circulating a surfactant composition containing an alkyl polyglycoside, an ethoxylated alcohol, a caustic and an alkyl alcohol through the well bore with a coiled tubing.

In U.S. Pat. No. 7,296,627; U.S. Pat. No. 7,497,261; U.S. Pat. No. 7,632,785; and U.S. Pat. No. 7,670,993, there is disclosed a method, apparatus, and composition for the simultaneous removal of asphaltene, and/or paraffin and scale from producing oil wells and which formulation consists of (1) from about 50% to about 98% by weight water; (2) from about 0.1% to about 15% by weight detergent; (3) from about 0.1% to about 20.0% hydrocarbon solvent; and (4) from about 0.1% to about 15% by weight acid, using the apparatus set forth in FIGS. 1, 2, and 3 of said patents. While these formulations are suitable for some applications, they are not effective in adverse weather conditions, such as cold ambient temperatures, and where the use of large amounts of water hinder the operation, such as solidifying and/or freezing the overall formulation when in is being injected into the oil well being treated.

While the prior art, U.S. Pat. No. 4,704,225 and U.S. Pat. No. 5,559,085, discloses the use of a terpene for use as a cleaning composition for removal wax, grease and/or fats, or as a drilling fluid per se, there is no disclosure of use of this material in a unique formulation in cleaning oil wells under adverse weather conditions.

The problems associated with the prior art set forth above are the use of numerous steps to remove paraffin, asphaltene, sludge, scale and/or other undesired materials from the wells and the fact that these multistep procedures are expensive, not efficient, and do not work in adverse weather conditions, such as where freezing temperatures are prevalent. These prior art problems are overcome by the unique one step method set forth below and the use of a novel cleaning emulsion which does not have to be heated to work over a wide range of temperatures, and which specifically works under adverse weather conditions, i.e. where freezing ambient temperatures are incurred, and also treats and reacts faster with the paraffins and asphaltenes than those materials of the prior art. The present invention cleaning formulation is a substantial improvement over those materials set forth in U.S. Pat. No. 7,296,627; U.S. Pat. No. 7,497,261; U.S. Pat. No. 7,632,785; and U.S. Pat. No. 7,670,993, and other prior art compositions. The present invention compositions/formulations (generally referred to herein as emulsions and interchangeably used therewith) overcome the prior art problems and provides and achieves substantial enhanced health, safety, and environmental characteristics for the oil industry.

SUMMARY OF THE INVENTION

The present invention provides a new process for the simultaneous removal of asphaltene and/or paraffin and scale from a well which is plugged with these types of materials. This novel process uses a unique cleaning emulsion comprising water, a detergent, a hydrocarbon solvent, a terpene hydrocarbon material, a demulsifier and, optionally, an acid, such as a mineral acid, (all in certain selected amounts), to be contacted with the well bore and bottom of the well for a sufficient period of time to break down the asphaltenes and/or paraffins and scale. This is the sole step in this operation but it is within the scope herein to use any wash tool in combination therewith to assist in this single procedure.

In accordance with one embodiment of the present invention, it is an object thereof to provide an improved method using a unique formulation for removing foreign matter from a well to increase the output flow of the well.

It is another object of the present invention to provide an improved method using a unique formulation in combination with any apparatus to clean the bore hole of the well to increase the output flow of the well.

It is still another object of the present invention to provide a one step process to simultaneously remove, under adverse weather conditions, the asphaltene and/or paraffin and scale and thus clean the bore hole of the well to increase the output flow of the well that is environmentally friendly, less expensive and easier to use than prior art materials, methods, and/or devices.

BRIEF DESCRIPTION OF THE PREFERRED EMBODIMENTS

In accordance with one embodiment of the present invention, a method of cleaning oil well to increase oil flow is disclosed. The method comprises the single step of preparing an cleaning emulsion comprising water, a detergent, a hydrocarbon solvent, a terpene hydrocarbon material, a demulsifier, and, optionally, a mineral acid, and then injecting said emulsion into the oil well.

In accordance with another embodiment of the present invention, the emulsion is injected into said oil well through the use of wash tool, such as, a combination surge and pressure wash tool. The combination pressure and surge wash tool has a nipple assembly, and a by-pass port is coupled to the nipple assembly. A diverter cup is coupled to the by-pass port. A plurality of pressure wash cups are positioned on the tool. A pressure wash port is located between the plurality of pressure wash cups. A pump shoe assembly is coupled to a bottom pressure wash cup. After the emulsion is injected into the well and is there for a short period of time, the surge and pressure wash tool is coupled to a tubing string of the oil well; the surge and pressure wash tool is then moved to the bottom of the oil well and then raised in repeat fashion.

The foregoing and other objects, features, and advantages of the invention will be apparent from the following, more particular, detailed description of the present invention and as illustrated in the accompanying drawings.

BRIEF DESCRIPTION OF THE DRAWINGS

The novel features believed characteristic of the invention are set forth in the appended claims. The invention in part, as well as a preferred mode of use, and advantages thereof, will best be understood by reference to the accompanying drawings, wherein like reference numerals and symbols represent like elements.

Figure 1:
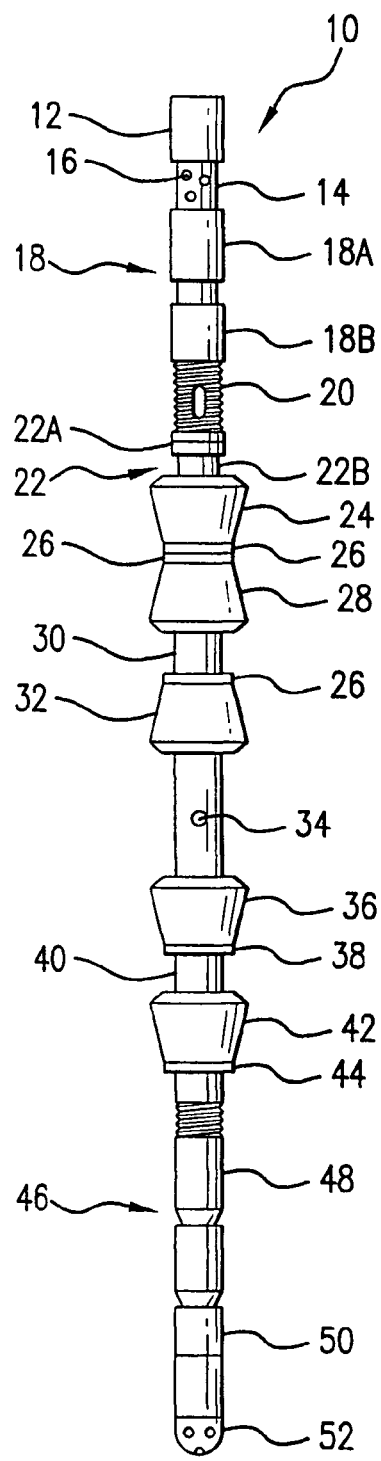
FIG. 1 is a simplified front view of the combination surge/pressure washer used in the present invention.

The novel cleaning emulsion of the present invention comprises (a) water; (b) a detergent; (c) a hydrocarbon solvent; (d) a terpene hydrocarbon material; (e) a demulsifier; and (f) optionally, an acid, such as a mineral acid, in portions as set forth herein. The pH of the oil well is determinative of whether or not there is a need for the acid to be included in the cleaning formulation/emulsion. It has been found that if the pH of the well is about 7.2 or less, then there is no requirement for the acid to be used as the results (without acid) will be essentially the same as if the acid component is used. The aforementioned acid, then, is not utilized when the oil well has a pH of 7.2 or less than about 7.2.

The water constitutes from about 10% by weight to about 40%, preferably from about 25% to about 35%, by weight based upon the total weight of the emulsion. In one preferred embodiment of the present invention, the water is conditioned before mixing with the other constituents of the emulsion. Water generally available today is electron deficient and not in optimum states of equilibrium. This conditioning is conducted by passing the required amount of water through a device that causes water molecules to transform from a static state to an excited or active state, thus releasing energies that transform the bonding of the water molecules and any of their dissolved or suspended particles. In essence, this conditioning procedure provides electrons to the water solution in a catalytic manner to reduce the electron deficiencies. This dissociation and modulus rearrangement of particle charges creates a beneficial altered state to the water, and which has been found to be synergistic when used with the other materials of the cleaning emulsion in the directed environment.

These water conditions are commercially available and sold under trademarked names, CARE FREE water conditioner and EASY CARE water conditioner.

The detergent constitutes from abut 0.1% by weight to about 15% by weight based upon the total weight of the emulsion, and preferably from about 0.1% to about 5%. A wide range of detergents can be used in the cleaning emulsion, such as, for example, (1) World's CHAMPION brand of waterless hand cleaners (The Sealex Corporation, San Jose, Calif. 95111), and (2) Gent-L-Kleen Products Inc. (York, Pa. 17402-0409) such as GENT-L-KLEEN; GRIME GRABBER; ADVANTAGE HD; GLK CITRUS lotion; ZAPPER cleaner; POWER WIPES FORMULA 2; and GLK soap. In the use of a detergent in the emulsion formulation, it is preferred that such detergent contains a surfactant such as an anionic surfactant, a nonionic surfactant, a cationic surfactant, a zwitterionic surfactant, an ampholytic surfactant, and which can be an individual surfactant or a mixture of these surfactants. Examples of anionic and nonionic surfactants are set forth below. The other surfactants stated above are known in the art.

Anionic surfactants used in detergents comprise fatty acid soaps, alpha olefin sulfonate, sulfonates, amine ethoxylates, amine salts or linear alkyl benzene sulfonic acid, aromatic sulfonates comprising cumene, xylene and toluene sulfonate, earth metal salts of olefin sulfonate and alcohol sulfates and sulfonates, as well as blends of such anionic surfactants.

Nonionic surfactants suitable for use comprise ethoxylated nonionic surfactants selected from the group consisting of condensation products of ethylene oxide with aliphatic alcohols having from 8 to 22 carbon atoms in either straight or branched chain configuration as well as ethoxylated nonionic surfactants selected from the group consisting of condensation products of ethylene oxide with nonyl phenol, phenol, butyl phenol, di-nonyl phenol, octyl phenol or other phenols, as well as blends of such nonionic surfactants.

The acid constitutes from 0.1% by weight to about 15% by weight based upon the total weight of the emulsion, and preferably from about 0.1% to about 5%. Suitable acids include hydrochloric, phosphoric, sulfuric, hydrofluoric, nitric, citric, oxalic, maleic, acetic, fumaric, malic, glutaric, or glutamic acids, as well as mixtures of such acid. The preferred acid is hydrochloric acid.

The hydrocarbon solvent constitutes from about 10% by weight to about 40.0% by weight based upon the total weight of the emulsion, and preferably from about 15% to about 35%. The hydrocarbon solvents suitable for use in accordance with the present invention include kerosene, gasoline, diesel, jet fuel, zylene and mixtures thereof. The preferred solvent is kerosene. Other solvents which can be used in the present invention include methanol, benzene, hexane, trichloroethane, acetone, isopropyl methanol, xylol, butanol, and isoproponal.

The hydrocarbon terpene material used constitutes from about 10% to about 40%, by weight, based upon the total weight of the emulsion. The terpene hydrocarbon material is an unsaturated terpene hydrocarbon material, preferably an unsaturated cyclic terpene hydrocarbon containing 10 carbon atoms and selected from limonene, dipentene, pinene, alpha-pinene, beta-pinene, mixtures of alpha- and beta-pinene, carene, delta-3-carene, etc.

The unsaturated terpene hydrocarbon materials used in the present invention are derivatives of pine tree products or citrus by products, and, therefore, are naturally occurring materials, and thus, environmentally friendly. These terpene hydrocarbon materials can be used alone or as mixtures. A readily available, inexpensive unsaturated terpene hydrocarbon material, and one which is preferred for use in accordance herewith is citrus limonene/d-Limonene or dipentene. Turpentine which is a mixture of predominately alpha- and beta-pinene may also be used. Alpha- and beta-pinene may also be used individually as the terpene hydrocarbon material ingredient. The various carene isomers may be used as a mixture or as individual components, e.g., delta-3-carene. Numerous other (unsaturated) terpene hydrocarbon materials are known to those skilled in the art and may be used herein. However, those mentioned above, such as citrus based terpenes, are the most readily available, environmentally friendly, and least expensive.

When the above materials are properly blended together (i.e. water, detergent, hydrocarbon solvent, terpene hydrocarbon material, and, if necessary, acid), there is formed a unique, stable emulsion. However, it has been found that the use of minute quantities of a demulsifier, has a syngeristic effect when used in the emulsion and facilitates the maintenance of the asphaltenes, paraffins and scale particles (undesired materials) in the washing or cleaning formulation/fluid being used and circulated in the oil well. The demulsifier (while being an emulsion breaker per se) has no adverse effect on the overall emulsion that is formed by blending the above stated ingredients, since it is utilized in only in minute quantities, parts per million (ppm), but does have a unexpected result of keeping the undesired materials suspended in the cleaning formulation. However, the exact mechanism is not clear and the applicant does not wish to be limited by any theory as to how the overall chemistry/physics works when the demulsifier is used.

The demulsifier (sometimes referred to as an emulsion breaker) is present and constitutes from about 0.000001% to about 0.00001% by weight, based on the total weight of the emulsion. Otherwise stated, the demulsifier is present in from about 1 ppm to about 100 ppm, based upon the total weight of the emulsion.

The demulsifier are generally formulated by combining several generic classes of demulsifying agents such as resins: phenoic resin (nonilphenol based) crude emulsion breakers requires being ethoxylated and/or propoxylated with ethylene oxide or propylene oxide before application. Phenolic resins (amilphenol based) or phenolic resin (butylphenol based), glycols, esters and sulfonates. These formulations provide the broad spectrum of products necessary to be utilized in the present invention formulation. One such preferred demulsifier is sold under the trade name Solvit D 4041, manufactured and sold by M. I. Swaco, Houston, Tex.

Figure 2:
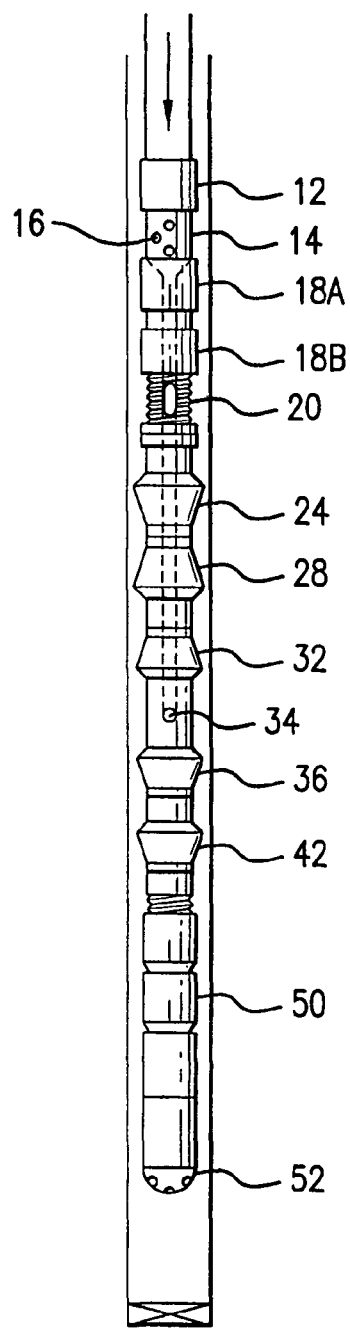
FIG. 2 is a simplified front view of the combination surge/pressure washer used in the present invention in a downward movement on a tubing string of an oil well.
Figure 3:
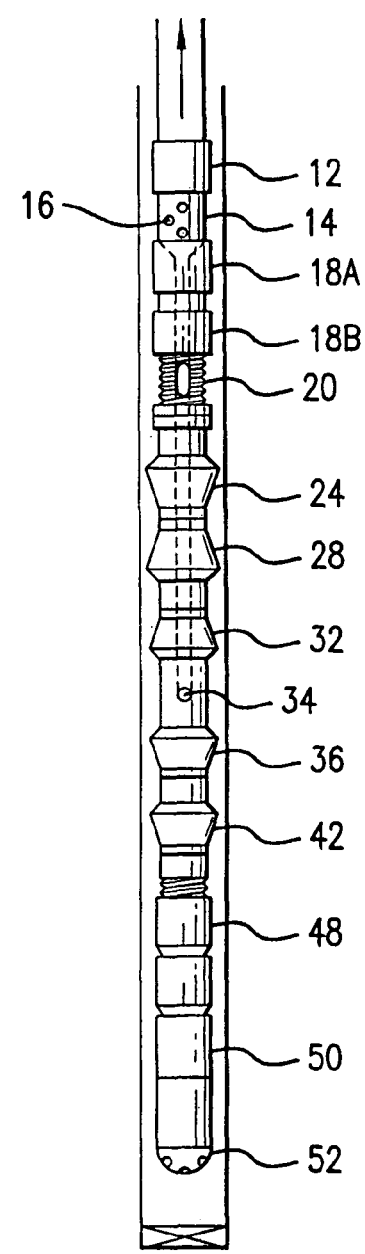
FIG. 3 is a simplified front view of the combination surge/pressure washer used in the present invention in an upward movement on a tubing string of an oil well.

Thus, the well bore can be cleaned with the novel emulsion set forth herein and during adverse weather conditions. In another facet of the present invention, the one step cleaning process can be carried out by use of a variety of wash tools, for example, by using the device as described below and shown in FIGS. 1-3. The prior art also discloses several wash tools as exemplified in U.S. Pat. No. 1,916,875; U.S. Pat. No. 2,055,515; U.S. Pat. No. 2,290,441; U.S. Pat. No. 2,512,801; U.S. Pat. No. 2,842,211; U.S. Pat. No. 3,760,878; U.S. Pat. No. 3,833,060; U.S. Pat. No. 3,861,465; U.S. Pat. No. 4,027,732; U.S. Pat. No. 4,393,930; U.S. Pat. No. 4,431,058; U.S. Pat. No. 4,505,341; U.S. Pat. No. 4,671,355; U.S. Pat. No. 4,921,046; U.S. Pat. No. 4,899,821; U.S. Pat. No. 4,991,653; U.S. Pat. No. 5,161,612; U.S. Pat. No. 5,135,051; U.S. Pat. No. 6,070,677; U.S. Pat. No. 6,070,677; U.S. Pat. No. 6,397,864; U.S. Pat. No. 7,836,947; U.S. Pat. No. 7,857,058; and publication U.S. 2003/0111226 A1.

Additional wash tools that can be utilized in the present invention include those self-rotating nozzle devices disclosed in U.S. Pat. No. 5,909,848 and U.S. Pat. No. 6,059,202. In general, these are used with a filter attached to the upper portion of said devices (which in turn is attached to the end of the coiled tubing and/or production string/tube) to prevent the nozzles from plugging due to any foreign and/or large particles in the emulsion pumped through the production tube. These devices can supply the novel cleaning formulations at pressures up about 20,000 psi.

All of the references cited herein are to be considered as incorporated herein as if physically copied into and stated in this specification.

The wash tools utilized herein, thus, can be any "wash tool" that can conveniently be attached to the bottom of the production tube/string tube and/or coiled tubing.

A surge/pressure wash tool, for example, which can be used with the present invention cleaning formulation (and which has been found to be quite efficient for the cleaning procedure when used in conjunction with the cleaning emulsion) is more fully described below.

Referring now to FIG. 1, a combination surge/pressure wash tool 10 (hereinafter tool 10) is shown. The tool 10 is used in conjunction with the novel aqueous cleaning emulsion in the oil industry to assist in cleaning and purging undesirable foreign matter which will partially/fully block the production tube or drill string of the finished well. The tool 10 and method of using the tool 10 with said emulsion will assist in cleaning any obstructions (e.g. asphaltene, paraffin and scale) in the well thereby increasing the production from the well.

The tool 10 is designed to work in both shallow and deep wells as well as low or high fluid level wells. The tool 10 is further designed to handle the different pressures encountered during surge and pressure washing workovers. The tool 10 can be easily modified to convert from a pressure wash tool to a surge wash tool as disclosed herein.

The tool 10 is comprised of a combination of parts to form a tubular shaped device. The tool 10 has a hollow interior in order to allow the emulsion to flow through tool 10. The tool 10 has a collar 12 located on the top section of the tool 10. The collar 12 is generally circular in shape and will have a central opening there through. The collar 12 is used to attach tool 10 to the tubing string of the well. The collar 12 is coupled to a perforated nipple assembly 14. The perforated nipple assembly 14 is conical in shape. The perforated nipple assembly 14 will have a tubular top section which narrows down in width similar to a funnel. A plurality of annuli 16 are located around the outer top perimeter of the tubular top section of the perforated nipple assembly 14. The annuli 16 allows the emulsions to enter and flow through tool 10 when tool 10 is configured as a surge wash tool.

A connector assembly 18 is used to couple the non-perforated nipple assembly, not shown. The connector assembly 18 is used to couple the perforated nipple assembly 14 to a by-pass port 20. The connector assembly 18 may be formed of a variety of components. In the embodiment depicted in the Figures, the connector assembly 18 comprises of a male and female connector 18A which is coupled to the tubular top section of the perforated nipple assembly 14. A collar 18B is then coupled to the male and female connector 18A and the by-pass port 20.

The by-pass port 20 is coupled to the collar 18B. The by-pass port 20 extends down to the bottom of tool 10. The by-pass port 20 will transport said emulsion with tool 10. The by-pass port will further allow said emulsion to enter the tool 10 during certain operating conditions described herein.

A spacing device 22 is coupled to a top section of the by-pass port 20. In the embodiment depicted in the Figures, the spacing device 22 is a combination nut 22A and a spacer 22B. Coupled to the spacing device 22 is a diverter wash cup 24. The diverter wash cup 24 is conical in shape; the diameter of the bottom section is slightly smaller than the diameter of the top section. The diverter wash cup 24 is used to divert the emulsion with sand from the by-pass port 20 and out of the bottom of tool 10.

Coupled to the bottom of the diverter wash cup 24 is a pair of holding devices 26. The first holding device 26 is used to hold the diverter wash cup 24 in position. The second holding device 26 is coupled directly below the first holding device 26. The second holding device 26 is used to hold a wash cup 28. The wash cup 28 is also conical in shape; the diameter of the bottom section is slightly larger than the diameter of the top section. The wash cup 28 is used to create a suction in the well which helps to draw and purge out the emulsion within tool 10.

A spacer 30 is coupled below the first wash cup 28. A holding device 26 is coupled below the spacer 30. The holding device 26 is used to secure a second wash cup 32. The second wash cup 32 is similar to the first wash cup 28. The second wash cup 32 is conical in shape; the diameter of the bottom section is slightly larger than the diameter of the top section. The wash cup 32 is used to create a suction in the well; thus drawing in and purging out the emulsion within tool 10.

Located below the second wash cup 32 is a pressure wash port 34. The pressure wash port 34 allows the emulsion to exit tool 10. In operation, the movement of tool 10 will cause the emulsion to exit the pressure wash port 34 at an elevated pressure. The pressurized fluid will clean debris which is hindering the flow of oil out of the well. Thus, pressure wash port 34 allows tool 10 to assist the emulsion in the cleaning and opening the clogged perforations and openings of the wells.

The tool 10 will further have a third wash cup 36 located below the pressure wash port 34. The third wash cup 36 is similar to wash cups 28 and 32. The wash cup 36 is conical in shape; the diameter of the bottom section is slightly smaller than the diameter of the top section. The wash cup 36 is used to help draw in and purge out the emulsion within tool 10. A holding device 38 is couple to a bottom section of third wash cup 36. The holding device 38 is used to hold the third wash cup 36 in position on tool 10.

A fourth wash cup 42 is coupled below the third wash cup 36. A spacer 40 may be positioned between the third wash cup 36 and the fourth wash cup 42. The fourth wash cup 42 is also conical in shape; the diameter of the bottom section is slightly smaller than the diameter of the top section. The wash cup 42 is also used to help draw in and purge out the emulsion within tool 10. A holding device 44 is used to secure the fourth wash cup 42 in position on tool 10.

A pump shoe assembly 46 is coupled below fourth wash cup 42. The pump shoe assembly 46 helps to control the intake and the dispersal of the emulsion in tool 10. The pump shoe assembly 46 has a connector 48 positioned below fourth wash cup 42. In the embodiment depicted in the Figures, the connector 48 is a male/female connector. A pump shoe valve 50 is coupled to the connector 48. The pump shoe valve 50 has a swing flap internal, not shown, to the pump shoe valve 50. The movement of tool 10 will control the movement of the swing flap. A ported blow plug 52 is coupled to the bottom of the pump shoe valve 50.

The tool 10 can be used in both deep and shallow wells and in low and high fluid wells. The tool 10 is easily converted from a surge wash tool to a pressure wash tool by removing the perforated nipple assembly 14 and replacing it with a non-ported (no perforations) nipple assembly. The by-pass port 20 is covered with a spacer between locking nuts. The pump shoe valve 50 on the bottom of the tool 10 is also removed. The ported blow plug 52 is replaced with a non-ported blow plug. The change from a surge wash tool to a pressure wash tool will reduce the washing distance, for example, from 45 to 70 feet down to 2 feet of the distance between the two wash cups on either side of the pressure wash port 34. The pressure wash tool is used in deeper and high pressure wells. The pressure wash tool also requires a high pressure pump that pumps the emulsion down the tubing string and out the pressure wash port 34.

Wash Tool Operation

Referring to the Figures wherein like numerals and symbols represent like elements, the operation of tool 10 is as follows. The tool 10 is designed to be coupled to the tubing string of an oil well. The tubing string is held by the oil rig's elevator which is attached to the oil rig's blocks and travels the height of the oil rig's derrick. The up and down (vertical) movement in the well causes tool 10 to assist the emulsion in cleaning debris (asphaltene, paraffin and scale) in the bore hole. Pressure is applied to well perforations on the downward movement of tool 10 and suction is applied to the well perforations on the upward movement of tool 10.

As stated above, tool 10 runs on the tubing string of the well so that the washing action of the tool 10 is the distance that the rig's blocks travel up and down the derrick length, approximately 45 to 70 feet per run.

In treating a well, the emulsion can be added to the well prior to using the wash tool. In accordance with one embodiment of the present invention, the emulsion is added at least several hours (e.g. 10 to about 100 hours) prior to using tool 10. This will allow a sufficient amount of time for the emulsion to circulate within the well and breakdown the asphaltenes, paraffins and scale build-up/debris. The novel emulsion is as described herein.

The tool 10 is coupled to the tubing string. On the downward motion of the tubing string, tool 10 will enter and move down the bore hole of the oil well. The tubing string and tool 10 are free floating until tool 10 passes the bottom perforation. Then the blocks are moved up the oil derrick, thus moving the tubing string with tool 10 up the bore hole.

The emulsion is injected into tool 10 through the use of a high pressure pump which injects the fluid into the plurality of annuli 16 which are located around the outer top perimeter of the tubular top section of the perforated nipple assembly 14.

As tool 10 is lowered, the swing flap internal to the pump shoe valve 50 is in a closed position. The emulsion in the well, that is located below the bottom wash cup 42, will be forced to enter the tool 10 through the ported blow plug 52. The emulsion in the well will pass through a hole in the swing flap and exit at the by-pass port 20. The emulsion in the well, as it travels through tool 10, will mix with emulsion being injected into tool 10. This combined emulsion will then be used to clean the well. The emulsion injected into tool 10 will also exit the tool 10 at the pressure wash port 34, further cleaning the well.

On the upward movement of tool 10, a suction is created below each of the wash cups. This draws emulsion and sand into the well bore. The by-pass port 20 allows the emulsion to enter during the upward movement of tool 10. The emulsion and any debris/sand are sent through tool 10 and out the ported blow plug 52. The swing flap is now in the open position thus allowing the emulsion and the debris/sand to exit and be deposited at the bottom of the well.

The novel emulsion thus functions in one part of the present invention as a "pre-treatment stimulation service fluid" allowing for the designed solvents to be water soluble and acid (e.g. hydrochloric acid) to be oil soluble for the cleaning of well bore perforations during well circulation. This fluid stimulation design can be used alone or it can also be made to work in combination with the mechanical devices of set design, e.g. "wash tools", for this operation as described herein.

The surge/pressure wash tool can be used in both shallow and deep oil wells by making a few changes in the wash tool configuration. These changes can then handle the different pressures encountered during surge/pressure or pressure washing operations. This one wash tool can take the place of two (2) wash tool's of the prior art.

In another embodiment of the present invention, a hydro self-rotating pressure nozzle wash tool with built-in filter system is run on the rig's tubing string and can be used in both shallow and deep oil wells. This wash tool can also be used in damaged wells that have restricted entry. The pressure to the self-rotating nozzles and jets is controlled from the surface.

In one part of the present invention, the chemical and mechanical treatment on marginal oil wells opens up plugged perforations so that increased fluid can flow into the well bore allowing more oil production from the wells.

The chemical phase is the novel cleaning emulsion, "the designed work over fluid", that is water, solvent, terpene material, demulsifier, and, optionally, acid are soluble and stable simultaneously. This "work over fluid" combination allows the emulsion to penetrate the oil barrier and dissolve scale while at the same time blend with the oil to break down the bonds of paraffin, bitumen and ashphaltines. In essence, it makes the entire emulsion/fluid in the well bore a cleaning agent. The emulsion/work over stimulation fluid is circulated around the well bore through the annuli up the tubing string and back down the annuli by utilizing the well's pumping unit for a period of time, e.g. 24, 48 and/or 72 hours. After chemically cleaning the well, the well can be turned back to production, with no harm to the operating facilities or the well can be pulled by a rig, and a surge/pressure wash or high pressure wash job done on the well to further clean the perforations if needed.

The surge/pressure wash tool is run on the tubing string and/or coil tubing so that the washing action of the wash tool is the distance that the rig's blocks travel up and down the derrick length. The surge wash tool can be used in both low and high fluid level wells with the use of a "ported nipple" in high fluid wells and a "knockout assembly" in place of the ported nipple in low fluid wells. The surge/pressure wash tool is converted to a pressure wash tool from a surge wash tool by removing the ported nipple and replacing it with a non-ported nipple. Then the diverter port is covered with a spacer between two locking nuts, and removing the pump shoe valve on the bottom of the tool. The last step is to replace the ported blow plug with a non-ported blow plug, not shown. The change from a surge wash tool to a pressure wash tool will reduce the washing distance from e.g. 45 to 75 feet down to 2 feet or the distance between the two center cups on either side of the pressure port. The pressure wash tool is used in deeper and high pressure wells. The pressure wash tool also requires a high pressure pump that pumps the treated fluid/emulsion down the tubing string and out the pressure port in the wash tool.

The hydro self-rotating down hole stimulation wash tool is designed to adapt the self-rotating nozzle that is used in the oil industry today on coil tubing that requires a separate piece of work over equipment and is not the equipment that pulls the down hole pump, rods and tubing from the well and services the well. This adaptation allows the self-rotating nozzle assembly/wash tool device to be run on the tubing string of the work over service rig that pulls the well without the need of other outside support equipment.

With reference to the above described matter, the present invention covers a single step process for cleaning oil wells with the novel emulsion and/or combination chemical/emulsion and mechanical cleaning process for oil wells. The chemical application in this latter case acts as a pre-treatment that converts the well bore fluid into a cleaning agent. The base chemical allows solvents/terpene material to become water soluble. The solution acts in the well bore to break down paraffin, asphaltene, and bitumen bonds that are plugging the entry of emulsion/fluid into the well bore from the formation. The well is placed into circulation by using its own pumping unit for a period of e.g. 24, 48, and/or 72 hours.

Well perforations can also be plugged by a combination of layers of scale, paraffin and asphaltenes. In these plugging cases and if the well has a pH is greater than about 7.2, an acid, for example, a mineral acid (HCL) is mixed with the cleaning formulation/agent (along with the solvent/terpene material). The mineral acid (HCL) becomes oil soluble and will react with the scale, while the solvents/terpene materials and demulsifier concurrently react with the paraffins asphaltenes and bitumens and keep them in solution. This reaction breaks down the bonds that hold the combination scale mixture to the casing wall and plugs the perforations. The reaction of the mineral acid with the scale (e.g. calcium carbonate) will create $CO_2$ gas that is released in the well bore; this $CO_2$ gas will aid in the cleaning action and help break the bonds of the material plugging the wells perforations. At the end of (e.g. 24, 48, and/or 72 hours) circulating period, the well can be returned to production or the well can be further cleaned by mechanical means using the emulsion already in the well.

When chemical treatment is followed by mechanical cleaning, the pre-treatment fluid/emulsion is left in the well bore. The well now can be cleaned with either a surge/pressure wash tool or a hydro self-rotating nozzle stimulation wash tool, or the self-rotating nozzle high pressure wash tool can be used alone with the novel cleaning formulation.

The surge/pressure wash tool is run on the work over rigs tubing string. The up and down movement of the tubing string in the well bore allows the wash tool to assist in cleaning the perforations. The surge/pressure wash tool cleans the well bore and perforations both in the downward movement with the weight of the tubing string and the upward movement with suction. The well bore perforations are cleaned while the rig's blocks travel the height of the rigs derrick. The emulsion/pre-treatment fluid cleaning agent is left in the well bore while the surge/pressure washing is being done; if more emulsion/treatment fluid is needed, it can be added down the annuli during the well cleaning.

The self-rotating nozzle high pressure wash tool is designed to be run on the work over rig's tubing string. At the surface, high pressure emulsion/stimulation fluid is pumped down the tubing string; this activates the self-rotating nozzle head at the bottom of the tubing string and allows the high pressure jetted emulsion/fluid to clean the well perforations. The tubing string is raised up and down in the well bore while pumping the emulsion/stimulation fluid. The tubing string that holds the wash tool is held in place by the rig's elevators which are attached to the rig's blocks and travel the height of the rig's derrick. High pressure emulsion/stimulation fluid is pumped at the surface through the tubing string to the wash tool on the bottom from a high pressure pump truck that has its own emulsion/fluid supply tank. The emulsion/stimulation fluid passes through a series of filters located above the wash tool and at the top of the wash tool. The in-line filters keep the jets free of foreign materials during washing operations. High pressure emulsion/fluid exits the nozzles through the jets in two (2) directions to clean the perforations and casing well bore.

The advantages of the present invention are that the oil well emulsion is:
1. Economical and environmentally safe
2. Allows solvents/terpene materials to be water soluble
3. Allows mineral acid to be oil soluble
4. Cleaning solution/emulsion is oil, water, solvent/terpene material and acid soluble simultaneously
5. Stable under high to low temperature ranges, e.g. −20 F to about 120 F
6. Compatible with production facilities The surge/pressure wash tool is:
1. Wash tool design can be used for both surge and pressure washing
2. Surge washing is limited to a depth of 2,000 feet or 15,000 lbs.
3. High Pressure wash tool has greater depth range
4. Surge wash tool can be used on both low and high fluid level wells
5. By-pass port and fifth wash cup (diverter cup) are used to move sand through the wash tool to the bottom of the well
6. Pump shoe swing valve with hole in flap is used to relieve pressure during the downward movement of the wash tool The hydro self-rotating nozzle high pressure wash tool is:
1. Run on the tubing string so that the washing action of the tool is the distance that the rig's blocks travel up and down the derrick height, e.g. 45 feet on a single rig and 75 feet on a double rig.
2. Used in both low and high fluid level wells, high and low pressure wells and wells with wide temperature ranges
3. The wash tool nozzle is self-rotating by the applied pressure from the surface down tubing string with a maximum operating pressure of about 20,000 psi
4. The adapted holder for the self-rotating nozzle has its own filter system to keep the jets from plugging
5. No outside equipment is needed other then the service rig that pulls the well and the rig's high pressure pump truck with tank
6. The filter system is interchangeable for use with different types of tubing string sizes from 2⅜ inches, 2⅞ inches and 3 inches and fits in the bottom stand of tubing above the wash tool.
7. The holder of the self-rotating nozzle wash tool can be interchanged to adapt to different size self-rotating nozzle heads from ¾" to 1½" and emulsion/fluid pumping capacities from about 20 gpm to about 200 gpm Prior to the present invention, there was no low temperature chemical treatment stimulation/work-over fluid that was simultaneously oil, water, solvent/terpene material, and acid soluble, nor was it stable under all kinds of operating conditions (e.g. low temperatures). Nor was there any cleaning formulation that was environmentally friendly and facility safe. This chemical emulsion treatment can stand alone or work in combination with the surge/pressure wash tool and/or the hydro self-rotating nozzle/high pressure wash tool. There is no cleaning formulation and/or mechanical device on the market used in the oil industry that will reduce well perforation cleaning by half (½) the time and have the cleaning job performance last from 3 months to 18 months. Using the novel chemical emulsion alone, or the combination chemical emulsion and the mechanical cleaning device process will open the well's entry to the formation and free the area between the well bore and the formation of scale, paraffin, asphaltene and bitumen.

EXAMPLES

Example 1

Preparation of the Cleaning Emulsion Using the Following Ingredients

| Product | gals/raw/ blend | %, by weight |
| --- | --- | --- |
| Norfox De-38 Modified Coconut Alkanolamide | 0.9372 | .63403 |
| Norfox NP4 Nonylphenokypoly Ethane | 0.19525 | .1425 |
| Chevron Shingle Oil Refined Mineral Oil | 0.20306 | .1482 |
| Versene Tetra Sodium Salt | 0.00422 | .00308 |
| Ashland Mineral Spirit (Mineral Spirits 7.5% Aromatic) | 5.67 | 4.13839 |
| Kerosene Red Dyed | 45 | 32.84438 |
| Rig Wash Terpene, Florida Chemical | 45 | 32.84438 |
| Conditioned Water | 40 | 29.195 |
| Demulsifier cold temperature design | 0.08 | .00786 |
| Total Number of Gallons Per Blend | 137.09 | |

The first five items listed above (detergent) were blended with one gallon of conditioned water in a 200 gallon container and then 5 gallons of kerosene were added to this blend and mixed thoroughly. There was then added five gallons of Rig Wash/terpene and the resultant material mixed continuously; thereafter, additional Rig Wash/terpene and kerosene were added equally until an emulsion was formed. Once the initial emulsion was formed, then the remainder of the Rig Wash/terpene, kerosene, and conditioned water were blended into the emulsion, resulting in a relatively thick emulsion (similar to a "mike shake"). At this point, the demulsifier was added and blended therein to yield a final emulsion product and which was very stable.

In the event that the oil well being treated had a pH of greater than 7.2, then it is necessary to prepare an acid solution as follows: Another 200 gallon container is mounted next to the treating tank near the oil well and then a 31%, by weight, muriatic acid (HCL) is placed in this tank and maintained therein until the emulsion is ready to be injected into the well. The acid is injected into the emulsion stream before the pump intake side in order that the acid and emulsion are well mixed going into the oil well.

At the oil well site, 12.5 gallons of said emulsion was placed in a 200 gallon container and then 70 gallons of catalytic conditioned water was introduced by the use of a nozzle attached to the end of the conditioned water hose. The fluid in the tank was further mixed by circulating it from the bottom to the top of the tank by a pump for a period of 5 minutes. This emulsion/fluid was stable and water/oil soluble.

Example 2

Treating Oil Wells with the Emulsion

Using the procedure set forth in Example 1, ten batches of emulsion/fluid were prepared and used to treat ten individual partially/fully plugged oil wells in Wyoming and South Dakota and at ambient temperatures ranging from −17 F to 47 F.

In each case, the emulsion/fluid from the 200 gallon tank was pumped into the well bore through the annuli thereof. After the emulsion was pumped from the tank into the well bore at a pressure to overcome the well bore pressure, the well was then shut-in and allowed to soak for 3 days before placing on circulation for 24 hours by using the pumping unit on location. Each well was placed back in operation/production. The average production increase was 41 barrels per day/10 wells or an average of 4.1 barrel increase/day/well.

Example 3

Treating Oil Wells with the Emulsion in Combination with Surge/Pressure Wash Tool Following the procedures set forth in Examples 1 and 2, another well was injected with 30 barrels of the emulsion. A surge/pressure wash tool was placed at the end of the tubing string and run into the well. Then an additional 100 barrels of emulsion fluid was allowed to gravity flow into the well through the annulus casing valve. The emulsion followed the wash tool down the well. When the wash tool reached the slotted liner or the perforated zone, the wash tool began to float indicating the well was still plugged. After 15 minutes, the wash tool reached the bottom of the well. Then it was moved up and down the length of the derrick (45 feet) thus promoting a suction in the upward movement of the wash tool, below the wash tool. The tubing string and wash tool on its own weight returned to the bottom of the well with the lowering of the rig's blocks and elevators holding the tubing string. This movement downward was adding pressure below the wash tool because of the placement of the cups. The emulsion entered the tubing string and wash tool through the perforated nipple above the wash tool. The up and down movement was repeated for about 15 times until there was no more resistance to the wash tool across this area. One joint/stand of tubing was removed from the tube string at the surface and the procedure above repeated for 12 times until all the perforated intervals were washed. The emulsion was then pressured into the formations of the well and the well was placed back in operation the next day after checking for any solids settlement. The increase in production of this well was 5.1 barrels per day.

Example 4

Treating Oil Wells with the Emulsion in Combination with the Pressure/Surge Wash Tool Following the procedures set forth in Examples 1 and 2, another well was injected with 50 barrels of the emulsion. The pressure/surge wash tool (no perforated nipple above the tool) was placed on the end of the tubing string. The tubing string was then placed in the hole and was run to the bottom of the well. When it reached the bottom, a pump at the surface was engaged and 100 barrels of conditioned water containing 25 gallons of emulsion was pumped under pressure down the tubing string and out of the port in the tool between the cups. The pressure in the pump dropped as the water/emulsion was displaced into the formation and then the tubing string was slowly moved up the hole. This process was repeated until the water/emulsion had been displaced into the formation. The pressure in the well was bled off at the surface from the pump's by-pass to a holding tank. Then one joint/stand was removed from the tubing string and the high pressure hose was then reconnected to the tubing string and the procedure was repeated up the hole until all perforations were treated and all the water/emulsion had been displaced. The wash tool on the tubing string was then removed from the well, and the well was shut-in for 24 hours in order to allow fill or solids to settle to the bottom. After 24 hours, the fill is removed from the bottom of the well and returned to production. The increase in production of this well was 5.5 barrels per day.

Example 5

Treating Oil Wells with the Emulsion in Combination with the Hydro Self-Rotating Nozzle/High Pressure Wash Tool Following the procedures set forth in Examples 1 and 2, the well was not returned to production, and the emulsion remained in the well. After checking the well for fill, the Hydro-tool was placed on the tubing string and run down the hole to a point just above the fluid level in the well. A high pressure pump was engaged at the surface and additional emulsion/treatment fluid was pumped into the tubing string until the pressure reached approximately 200 psi; this was conducted to insure that the tubing sting was full of fluid and the rotary tool was clear of obstructions and was operational. The pump was disengaged and 4 joints of tubing were added to the tubing string until the Hydro-tool was 10 feet off the bottom of the well. A high pressure hose was then connected to the tubing string and then the emulsion treated fluid was displaced out of the Hydro-tool. The surface pressure was increased to 2100 psi and the Hydro-tool was moved up the hole very slowly. This up and down procedure was repeated 11 times, at which time the perforations were washed and the emulsion was displaced. After 24 hours, the well was returned to production after checking for fill. The increase in productivity of this well was 5.9 barrels per day.

Example 6

Treating Oil Wells with the Emulsion Without a Wash Tool

An oil well located in Meade County, South Dakota, having a depth of 3000 feet, was treated at an ambient temperature of 30 F using the formulation/emulsion as described in Example 1. Plugging of this well was determined to be at the 1184 to 1194 foot well bore levels in a 5½ inch diameter casing. The emulsion was placed in a 60 barrel container and the total volume of emulsion/fluid conditioner was 20 gallons emulsion to 50 barrels of conditioned water. The emulsion/fluid were mixed and 30 barrels of treating emulsion/fluid was pumped down into the casing to fill it. The on location pump was operated at 1150 psi to increase the pressure in the casing to this level. Then, additional emulsion/treatment fluid was pumped at this pressure, at the rate of 10 gallons per minute (gpm), for 60 minutes resulting in 14.3 barrels of emulsion/fluid pumped into the formation across the perforated interval. The well was then shut-in, and the work-over rig was moved off location. The pressure was measured at 700 psi, indicating the perforations were plugged at this point. Within 5 hours, the pressure had dropped to 200 psi, indicating activity within the well bore. After 5 days of being shut-in, the well went on vacuum at 22½ inches, indicating the perforations were substantially open. After another 8 days, the vacuum was measured at 24 inches, indicating that the perforations were basically fully open. After the static fluid level returned to the well bore (some 41 feet from the surface), the well was placed in operation and produced 8.1 barrels per day. As previously mentioned, it has been found that the pH of the well is determinative of whether or not there is a need for the acid to be included in the cleaning fluid. It has been found that if the pH of the well is about 7.2 or less than 7.2, then there is no requirement for the acid to be used as the results (without acid) will be essentially the same if the acid component is used. The following examples demonstrate this unique facet of another aspect of the present invention.

Examples 7 and 8

Preparation of the Cleaning Emulsion/Fluid with and without Acid

The basic emulsion was prepared according to the procedure set forth in Example 1 above. Into a 200 gallon tank, there was added 8 gallons of said emulsion and then 100 gallons of catalytic conditioned water was introduced by the use of a nozzle attached to the end of the conditioned water hose. The fluid in the tank was further mixed by circulating it from the bottom to the top of the tank by a pump for a period of 5 minutes. In example 7, no acid was utilized. In example 8, another batch of cleaning fluid was prepared as described above and just prior to the use of this example 8 fluid, 2 gallons of a 31% by weight solution of hydrochloric acid was added and mixed to the fluid/emulsion. This example 7 fluid/emulsion was stable and water/oil soluble.

Examples 9 and 10

Treating Oil Wells with the Examples 7 and 8 Fluid/Emulsions

Using the procedure set forth in Examples 7 and 8, 3 batches of Example 7 (no acid) and 3 batches of Example 8 (with acid) fluid/emulsions were respectively prepared and used to treat six individual partially/fully plugged oil wells in South Dakota. The pH of each of the six wells was determined prior the treatment, and the average pH was 7.1.

In each case, the emulsion from the 200 gallon tank was pumped into the well bore through the annuli thereof. After the emulsion was emptied from the tank, 50 gallons of conditioned water was pumped into the well. The well was then shut-in for three days. Then, additional emulsion/fluid, with and without acid, was pumped into the well bore according to the procedure set forth in Example 6. Each well was placed back in operation/production. The oil production increase was an average of 4.1 barrels/day/well for the Example 7 (no acid used) fluid used and 4.3 barrels/day/well increase for the Example 8 (with acid) fluid used. Thus, it can be appreciated that the pH of the well is a significant factor in the treatment of oil wells.

Examples 11 and 12

Comparative Examples

Treating Oil Wells with Prior Art and Present Invention Fluid/Emulsions

Approximately 12.5 gallons of prior art emulsion was prepared using the procedure set forth in Example 6 of U.S. Pat. No. 7,497,261 (no acid was used). Next, approximately 12.5 gallons of emulsion of the present invention was prepare using the process of Example 1 in the present specification (no acid was used). Two separate oil wells located in Meade County, South Dakota were located that had substantially the same pH of 7.1 and substantially the same plugging issues. The procedures for treating the oil wells were carried out at an ambient temperature of −17 F. Using the treating procedure set forth in Example 6 in the present specification, the two wells were treated in the same manner with the following observations and results. The prior art emulsion had a great tenancy to solidify and difficulty being injected into the well even after mixing with water. This prior art emulsion demonstrated little activity over the next three days as far as a significant reduction in pressure, thus indicating a lack of unplugging the perforations. The pressure decreased slowly and the end result was an increase of oil production of only 1.6 barrels per day. The present invention exhibited similar processing characteristics as that observed in Example 6 in the present invention and resulted in an increase of 7.4 barrels per day after a substantially shorter period of time for pressure drop and shut-in, before placing back into operation. Thus, it can be seen that the present invention is a substantial improvement over the prior emulsions and works better at significantly lower ambient temperatures.

In view of the above subject matter, some (but not all) of the inventive concepts/items are described below.

1. A one step process for removing both asphaltenes and/or paraffins and scale simultaneously from an oil well containing clogged perforations or openings comprising the steps of:
   a. preparing a cleaning emulsion comprising:
      i) from about 10% to about 40% by weight, water;
      ii) from about 0.10% to about 15% by weight, detergent;
      iii) from about 10% to about 40% by weight, hydrocarbon solvent;
      iv) from about 10% to about 40% terpene hydrocarbon material
      v) from about 0.000001 to about 0.00001% by weight, demulsifier; and
      vi) optionally, from about 0.1% to about 15% by weight acid, with the proviso that said emulsion is in a stable state over a wide range of temperatures.
   b. contacting said emulsion with the interior of the oil well for a period of time sufficient to dispense asphaltines, paraffins and scale within the well from said openings.
2. The process as set forth in item 1, wherein the water is conditioned water.
3. The process as set forth in item 1 wherein the detergent contains a material selected from the group consisting of zwitterionic, ampholytic, nonionic, anionic and cationic surfactants and mixtures thereof
4. The process as set forth in item 1 wherein the hydrocarbon solvent is selected from the group consisting of gasoline, diesel, jet fuel, kerosene, zylene, mineral spirits and mixtures thereof
5. The process as set forth in item 1 wherein the terpene material is an unsaturated cyclic terpene hydrocarbon containing 10 carbon atoms.
6. The process as set forth in item 5 wherein the terpene hydrocarbon material is selected from the group consisting of limonene, dipentene, pinene, alpha-pinene, beta-pinene, carene, delta-3-carene, and mixtures of these materials.
7. The process as set forth in item 6 wherein the contacting is conducted by supplying the emulsion, at high pressures, to the oil well through a production tube having attached to the end thereof a hydro self rotating nozzle wash tool.
8. The process as set forth in item 1 wherein (a) the water is conditioned; (b) the detergent contains a surfactant; (c) the hydrocarbon solvent is kerosene; (d) the terpene material is limonene; and (e) there is no acid present.
9. A method of cleaning an oil well containing asphaltene and/or paraffin and scale to increase oil flow therefrom comprising the steps of:
   a. adding a cleaning emulsion consisting essentially of water, a detergent, a hydrocarbon solvent, a terpene hydrocarbon material, a demulsifier, and, optionally, an acid into the oil well containing a tubing string;
   b. coupling a surge and pressure wash tool to said tubing string of the oil well;
   c. moving the surge and pressure tool to the bottom of said oil well; and
   d. raising the surge and pressure wash tool after a reasonable period of time, thereby providing a period of contact under pressure and vacuum of said emulsion with said asphaltene, paraffin and scale.
10. The method of item 9 further comprising the step of injecting said additional emulsion into the surge and pressure wash tool.
11. The method of item 10 further comprising the additional steps of:
    e). moving the surge and pressure tool to the bottom of said oil well after raising the surge and pressure wash tool; and
    f) raising the surge and pressure wash tool after a reasonable period of time.
12. The method of item 9 wherein in step b, replacing the surge and pressure wash tool with a hydro self-rotating high pressure nozzle wash tool which is then moved up and down the oil well as set forth in steps c, d, e, and f.
13. The method of item 9 wherein the surge and pressure wash tool comprises:
    a) a nipple assembly
    b) a by-pass port coupled to the nipple assembly wherein the port by-pass port allows the emulsion to enter the tool on an upward movement of the tool;
    c) a diverter cup coupled to the by-pass port wherein the diverter cup diverts the emulsion with debris down the tool and out a bottom section of the tool;
    d) a plurality of pressure wash cups positioned on the tool for creating a suction below each of the plurality of cups;
    e) a pressure wash port located between the plurality of pressure wash cups wherein the pressure wash port allows the emulsion to exit the tool at an elevated pressure to clean the wells; and
    f) a pump shoe assembly coupled to a bottom pressure wash cup.
14. The method of item 13 wherein the nipple assembly is a perforated nipple assembly having a plurality of annuli located around an outer top perimeter.

15. The method of item 13 wherein the nipple assembly is a non-port nipple assembly.
16. The method of item 13 wherein the pump shoe assembly comprises:
    a. a connector coupled to a bottom section of the tool;
    b. a pump shoe valve coupled to the connector; and
    c. a blow plug coupled to the pump shoe valve.
17. The method of item 13 and further comprising a swing flap internal to the pump shoe valve wherein the swing flap is open on an upward movement of the tool and closed on the downward movement of the tool.
18. A cleaning emulsion useful to remove asphaltene and/or paraffin and scale simultaneously from oil wells comprising:
    i) from about 10% to about 40% by weight, water;
    ii) from about 0.1% to about 15% by weight detergent;
    iii) from about 10% to about 40.0% by weight, hydrocarbon solvent;
    iv) from about 10% to about 40% by weight terpene hydrocarbon material;
    v) from about 0.000001 to about 0.00001% by weight demulsifier; and
    vi) optionally, from about 0.1% to about 15% by weight acid, with the proviso that said emulsion is in a stable state over a wide range of temperatures.
19. The emulsion as set forth in item 18 wherein the water is conditioned water.
20. The emulsion as set forth in item 18 wherein the detergent contains a material selected from the group consisting of zwitterionic, ampholytic, nonionic, anionic and cationic surfactants and mixtures thereof.
21. The emulsion as set forth in item 18 wherein the hydrocarbon solvent is selected from the group consisting of gasoline, diesel, jet fuel, kerosene, zylene, mineral spirits and mixtures thereof.
22. The emulsion as set forth in item 18 wherein the terpene material is selected from the group consisting of limonene, dipentene, pinene, alpha-pinene, beta-pinene, carene, delta-3-carene, and mixtures of these materials.
23. The emulsion as set forth in item 22 wherein the oil well has a pH of less than about 7.2 and acid is not present.
24. A cleaning emulsion useful to remove asphaltene and/or paraffin and scale simultaneously from oil wells, and which emulsion consists of:
    i) from about 25% to about 35% by weight, water;
    ii) from about 0.1% to about 5% by weight detergent;
    iii) from about 15% to about 35% by weight, hydrocarbon solvent;
    iv) from about 25% to about 35% by weight terpene hydrocarbon material;
    v) from about 0.000001 to about 0.00001% by weight demulsifier; and
    vi) optionally, from about 0.1% to about 5% by weight acid, with the proviso that said emulsion is in a stable state over a temperature range of from −20 F to 120 F.
25. The process as set forth in item 24 wherein there is no acid present.

In another aspect of the present invention, it has been found that the above composition has good application in the removal of oil from tar sands. Tar sands deposits are found throughout the world and are a potentially enormous oil resource. The largest tar sands deposits are found in Alberta (Canada) and Venezuela while smaller deposits can be found in Siberia (Russia), Saudi Arabia and other Middle-Eastern countries, and Utah in the United States. The current methodologies for recovering oil from tar sands typically require large economic and energetic expenditures. For example, the processes may require the use of heated water to recover the oil, which in itself may have a negative environmental impact. In this facet, there is provided a method of removing oil from tar sands comprising (a) contacting the tar sands with a mixture of (1) the above described composition and (2) water, wherein the water to composition is from 200 to 1, preferably 100 to 1, and more preferably from 50 to 1 (by volume), for a sufficient period of time and under agitation to form a layer of oil, a layer of water, and a layer of tar sand, which has a reduced amount of oil therein, and recovering oil from said layer of oil.

While the invention has been particularly shown and described with reference to preferred embodiments thereof, it will be understood by those skilled in the art that the foregoing and other changes in form and details may be made therein without departing from the spirit and scope of the invention. The emulsions/cleaning formulations may also be used for treating oil disposal wells, injection wells, gas producing wells, etc.

What is claimed is:

1. A cleaning emulsion useful to remove asphaltene and/or paraffin and scale simultaneously from oil wells consisting of:
    i) from about 10% to about 40% by weight, water;
    ii) from about 0.1% to about 15% by weight detergent;
    iii) from about 10% to about 40.0% by weight, hydrocarbon solvent;
    iv) from about 10% to about 40% by weight terpene hydrocarbon material;
    v) from about 0.000001 to about 0.00001% by weight demulsifier; and
    vi) optionally, from about 0.1% to about 15% by weight acid, with the proviso that said emulsion is in a stable state over a wide range of temperatures.

2. The emulsion as set forth in claim 1 wherein the water is conditioned water.

3. The emulsion as set forth in claim 1 wherein the detergent contains a material selected from the group consisting of zwitterionic, ampholytic, nonionic, anionic and cationic surfactants and mixtures thereof.

4. The emulsion as set forth in claim 1 wherein the hydrocarbon solvent is selected from the group consisting of gasoline, diesel, jet fuel, kerosene, zylene, mineral spirits and mixtures thereof.

5. The emulsion as set forth in claim 1 wherein the terpene material is selected from the group consisting of limonene, dipentene, pinene, alpha-pinene, beta-pinene, carene, delta-3-carene, and mixtures of these materials.

6. The emulsion as set forth in claim 5 wherein the oil well has a pH of less than about 7.2 and acid is not present.

7. A cleaning emulsion useful to remove asphaltene and/or paraffin and scale simultaneously from oil wells, and which emulsion consists of:
    i) from about 25% to about 35% by weight, water;
    ii) from about 0.1% to about 5% by weight detergent;
    iii) from about 15% to about 35% by weight, hydrocarbon solvent;
    iv) from about 25% to about 35% by weight terpene hydrocarbon material;
    v) from about 0.000001 to about 0.00001% by weight demulsifier; and
    vi) optionally, from about 0.1% to about 5% by weight acid, with the proviso that said emulsion is in a stable state over a temperature range of from −20 F to 120 F.

8. The process as set forth in claim 7 wherein there is no acid present.

* * * * *